United States Patent

De Renzis et al.

[11] Patent Number: 6,129,280
[45] Date of Patent: Oct. 10, 2000

[54] OPTICAL CODE READING METHOD AND DEVICE

[75] Inventors: Antonio De Renzis, Bologna; Claudio Mazzone, Crespellano, both of Italy

[73] Assignee: Datalogic S.p.A., Italy

[21] Appl. No.: 09/116,924

[22] Filed: Jul. 17, 1998

[30] Foreign Application Priority Data

Jul. 18, 1997 [EP] European Pat. Off. ............. 97830368

[51] Int. Cl.[7] .............................. G02B 26/08; G06K 7/10
[52] U.S. Cl. ................... 235/462.22; 235/462.12
[58] Field of Search .................... 235/462.38, 462.39, 235/462.33, 462.22, 462.12, 454

[56] References Cited

U.S. PATENT DOCUMENTS

| | | | |
|---|---|---|---|
| 4,041,322 | 8/1977 | Haysh et al. | 235/61.11 F X |
| 4,587,407 | 5/1986 | Ahmed et al. | 235/467 |
| 4,871,904 | 10/1989 | Metlitsky et al. | 235/467 |
| 5,000,529 | 3/1991 | Katoh et al. | 235/467 X |
| 5,254,844 | 10/1993 | Krichever et al. | 235/462 X |
| 5,268,565 | 12/1993 | Katoh et al. | 235/467 |
| 5,343,029 | 8/1994 | Katoh et al. | 235/467 |
| 5,532,480 | 7/1996 | Scofield | 235/462 X |
| 5,536,925 | 7/1996 | Bard et al. | 235/462 |
| 5,594,232 | 1/1997 | Giordano | 235/467 X |
| 5,663,550 | 9/1997 | Peng | 235/467 |

FOREIGN PATENT DOCUMENTS

| | | |
|---|---|---|
| 0436072 | 7/1991 | European Pat. Off. . |
| 60-238977 | 11/1985 | Japan . |

*Primary Examiner*—Karl D. Frech
*Attorney, Agent, or Firm*—Hall, Priddy, Myers & Vande Sande

[57] ABSTRACT

The reading method includes the step of successively performing a first and at least a second scan of an optical code along a first and, respectively, second scanning line parallel to each other. More specifically, the first and second scan of the optical code are performed by generating a first and a second laser light ray movable respectively in a first and second scanning plane distinct from and intersecting each other.

24 Claims, 4 Drawing Sheets

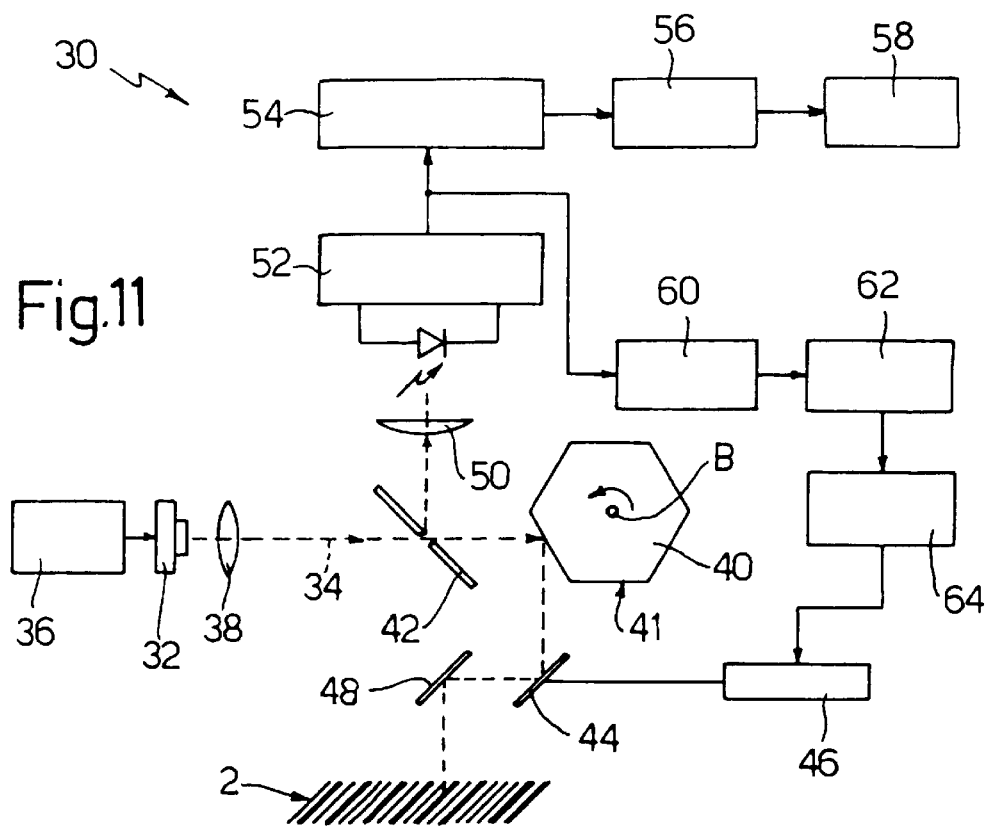
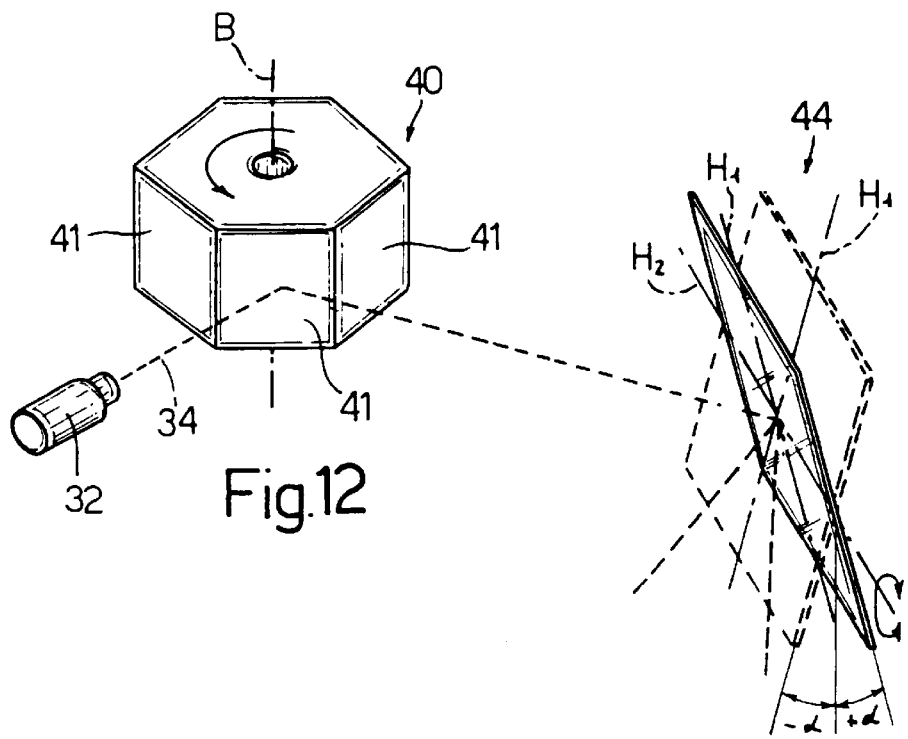

OPTICAL CODE READING METHOD AND DEVICE

BACKGROUND OF THE INVENTION

The present invention relates to a method and device for reading optical codes, in particular bar codes, to which the following description refers purely by way of example.

Various bar code reading techniques are known, the most commonly used of which provides, as shown in FIG. 1, for scanning a line running across the whole of the bar code. This technique is used in particular when the bar code is oriented a certain way with respect to the scanning line, and gives reliable results when the bar code is inclined with respect to the scanning line by less than a given angle (e.g. ±45° for oversquare section codes). Otherwise, the scanning line fails to cross one or more of the bar code elements (bars or spaces).

Randomly oriented bar codes, e.g. applied to a product placed randomly on a conveyor belt, on the other hand, are read by scanning as described above, but in two perpendicular directions to cover an angle of 180° ensuring the bar code is decoded however oriented.

Another equally common technique provides for partially scanning and reconstructing the bar code using known algorithms; that is, as shown in FIG. 2, for performing a number of scans along parallel scanning lines inclined with respect to the bar code, and each extending across only a portion of the code.

Each scan supplies a portion of the bar code, and the scanning lines are so arranged that a given portion of the code is crossed by different portions of successive scanning lines. Given the individual portions of the code supplied by individual scans, the bar code as a whole may therefore be decoded using a known so-called pattern matching algorithm.

The partial scans are commonly performed by moving the reader and the code with respect to each other, in particular by moving the code with respect to the reader, which repeatedly scans the code along a single scanning line.

The above bar code reading techniques are implemented using a reader comprising a laser light source, and a photodetector device located close to the light source and designed to operate solely with diffused light. More specifically, the laser light source generates a light ray which impinges on the bar code in a direction other than perpendicular to the code plane, so that the light reflected by the code travels in a different direction from that of the incident ray, and the photodetecting device only receives the light diffused by the code.

Under normal operating conditions of readers of the above type, however, light may be reflected in the propagation direction of the incident ray, thus resulting in saturation of the photodetector device and associated electronic circuits, and hence in "blinding" of the reader.

To overcome this drawback, some readers feature polarizing filters for eliminating the reflected rays re-entering the reader and generated by most known reflecting surfaces.

Some reflecting materials, however, generate reflected rays which cannot be eliminated by polarizing filters, as when the bar code is applied to or covered with a plastic surface generating considerable reflected light which is so polarized as to be unfilterable.

As such, currently used readers are not altogether immune to blinding and hence failure to read the bar code.

Moreover, the presence of unfilterable reflected light, even if not such as to actually blind the reader, undoubtedly endangers the reading when using the two perpendicular scanning direction technique, and particularly when using the partial scanning technique, the fairly complex sophisticated reconstruction algorithm of which demands optimum reading conditions and successful decoding of the bar code portion swept at each partial scan.

SUMMARY OF THE INVENTION

It is an object of the present invention to provide an optical code reading method and device permitting reliable reading of the optical code under any operating condition.

According to the present invention, there is provided a method of reading an optical code, characterized by comprising the step of successively performing a first and at least a second scan of said optical code along a first and, respectively, second scanning line distinct from each other.

The method according to the present invention is preferably characterized in that said first and said second scanning line are parallel.

The method according to the present invention is also characterized in that said step of successively performing said first and said second scan of said optical code comprises the step of generating a first and, respectively, second laser light ray movable respectively in a first and a second scanning plane distinct from and intersecting each other.

Conveniently, the method according to the present invention is also characterized by also comprising the step of determining successful decoding of said optical code on the basis of said first scan; and by performing said second scan in the event said decoding of said optical code on the basis of said first scan is unsuccessful.

According to the present invention, there is also provided a device for reading an optical code, characterized by comprising first and second generating means for respectively generating a first and second laser light ray for successively performing a first and a second scan of said optical code along a first and, respectively, second scanning line distinct from each other.

The reading device according to the present invention is preferably characterized in that said first and said second scanning line are parallel.

Conveniently, the reading device according to the present invention is characterized in that said first and second generating means comprise a laser light source for emitting a source laser light ray having a predetermined propagation direction; and orientable deflecting means located along the propagation direction of said source laser light ray and for generating said first and second laser light ray.

BRIEF DESCRIPTION OF THE DRAWINGS

A number of preferred non-limiting embodiments of the present invention will be described by way of example with reference to the accompanying drawings, in which:

FIG. 11 shows, schematically, a second embodiment of the reading device according to the present invention;

FIG. 12 shows a more detailed view of part of the FIG. 11 device;

DETAILED DESCRIPTION OF THE INVENTION

Figure 1:
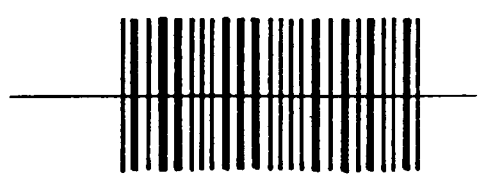
FIG. 1 shows a bar code read using a first known reading technique.
Figure 2:
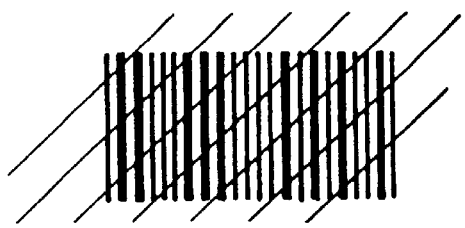
FIG. 2 shows a bar code read using a second known reading technique.
Figure 3:
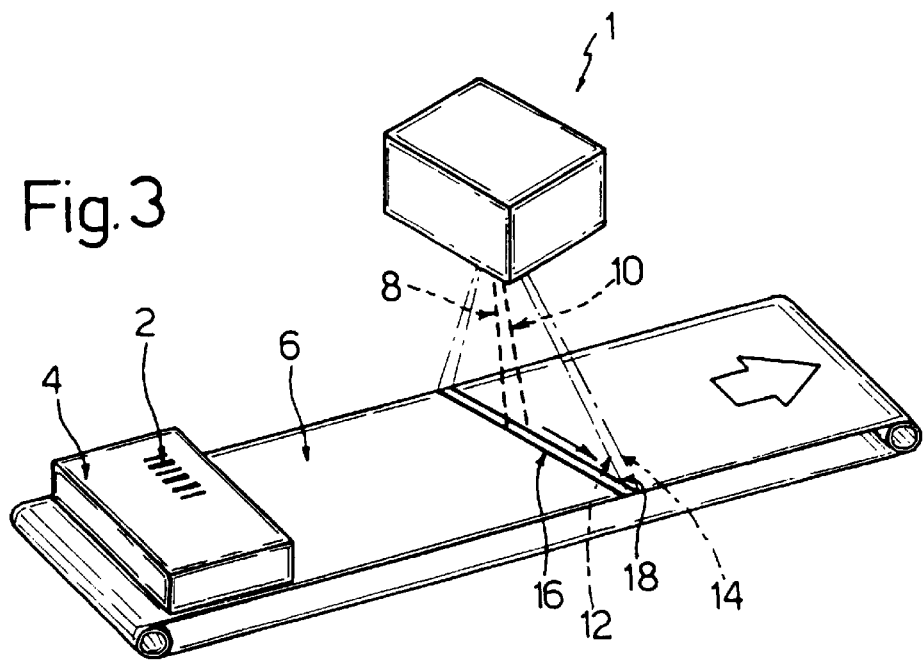
FIG. 3 shows, schematically, a first embodiment of the reading device according to the present invention, for reading specifically oriented bar codes.

Number 1 in FIG. 3 indicates a reading device according to a first embodiment of the present invention, and which provides solely for reading bar codes 2 inclined by less than a given angle with respect to the scanning direction. More specifically, the bar code 2 in FIG. 3 is applied to a package 4 placed on a conveyor belt 6 traveling in the direction indicated by the arrow.

According to the present invention, reading device 1 successively generates a first and second laser light ray 8, 10 (shown by the dash lines) diverging with respect to each other and movable respectively in a first and second scanning plane 12, 14 (shown by the dot-and-dash lines) distinct from and intersecting each other.

More specifically, laser light rays 8, 10 successively perform a first and second scan of bar code 2 along a first and, respectively, second scanning line 16, 18 (shown by the marked continuous lines) distinct from, in particular parallel to, each other.

Should first laser light ray 8 impinge on bar code 2 at a 90° angle so that reading device 1 is blinded by the ray reflected by bar code 2, second laser light ray 10 therefore impinges on bar code 2 at an angle other than 90° so that reading device 1 is no longer blinded and therefore capable of reading and decoding bar code 2.

Figure 4:
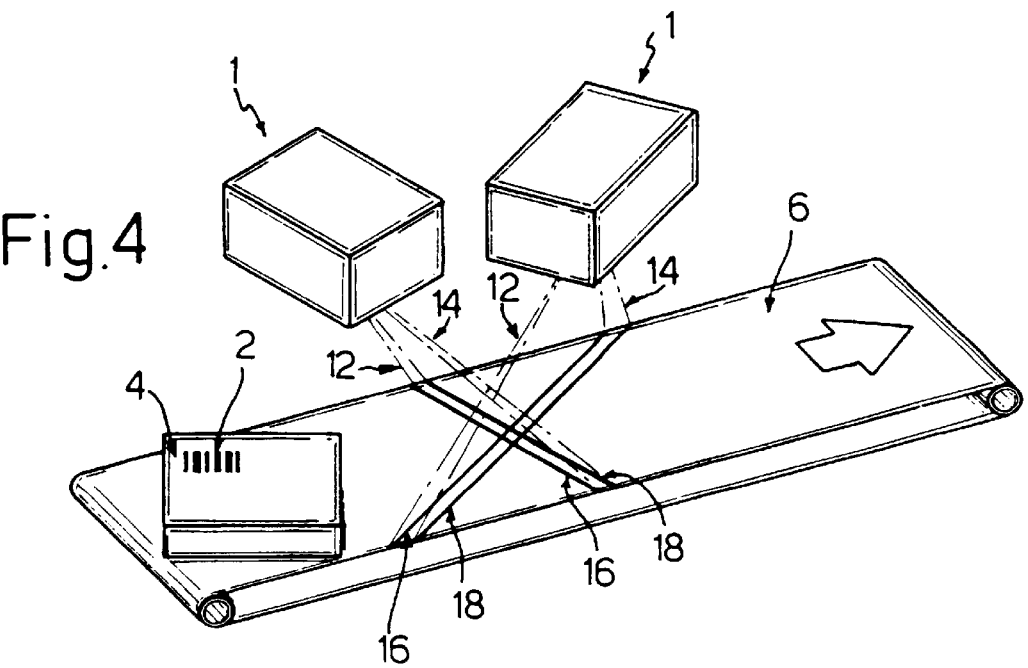
FIG. 4 shows, schematically, the mutual arrangement of two reading devices according to the present invention, for reading randomly oriented bar codes.

FIG. 4 shows, schematically, the mutual arrangement of two reading devices 1 as described above, for also reading a randomly oriented bar code 2. More specifically, the reading devices 1 in FIG. 4 are so arranged that the respective pairs of scanning lines 16, 18 generated by them are perpendicular to each other to cover an angle of 180°.

Figure 5:
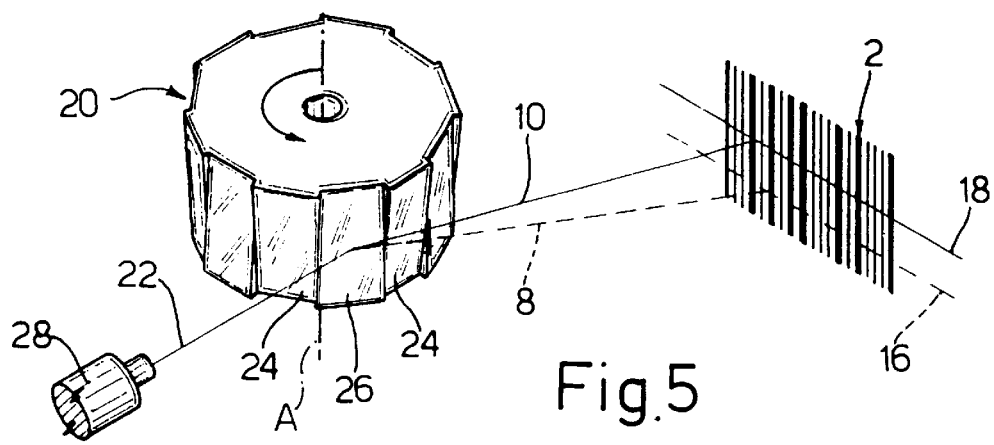
FIG. 5 shows a schematic view of a rotor forming part of the FIG. 3 reading device.

Diverging first and second laser light rays 8, 10 may be generated using a rotor of the type shown in FIG. 5 and forming part of reading device 1.

As shown in FIG. 5, the rotor, indicated 20, is roughly cylindrical, rotates in use about a respective axis of rotation A, and has a lateral surface defining a number of flat rectangular first and second reflecting faces 24, 26 alternating about axis of rotation A, and wherein adjacent reflecting faces 24, 26 are inclined at respective different angles with respect to axis of rotation A.

More specifically, first reflecting faces 24 are identical and inclined at the same predetermined angle with respect to axis of rotation A, and second reflecting faces 26 are identical with one another and inclined at the same predetermined angle with respect to axis of rotation A, but at a different angle from first faces 24.

Figure 6:
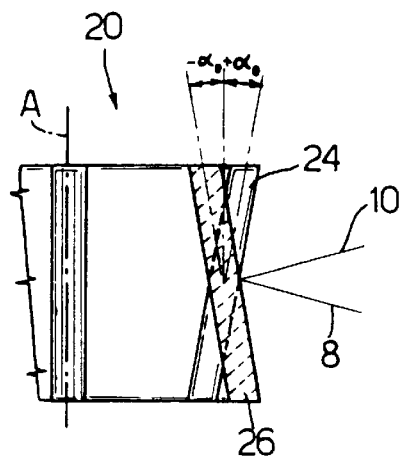
FIG. 6 shows, schematically, a preferred mutual arrangement of adjacent reflecting faces of the FIG. 5 rotor.
Figure 7:
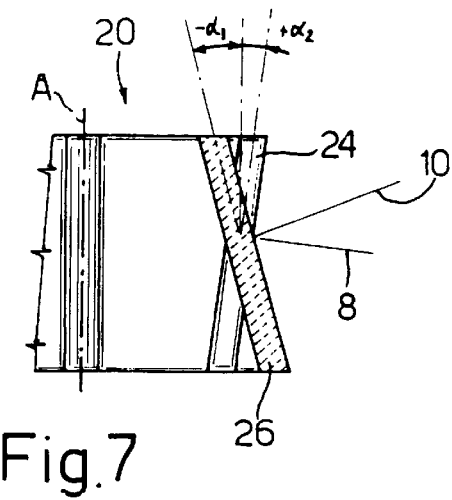
FIGS. 7 to 10 show, schematically, different mutual arrangements of adjacent reflecting faces of the FIG. 5 rotor.
Figure 8:
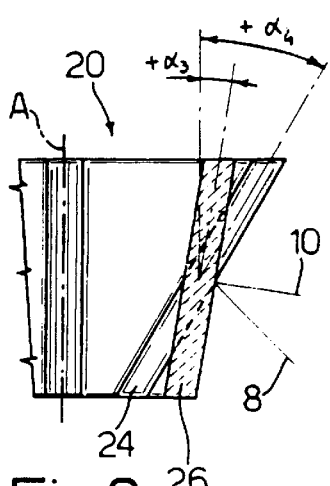
Figure 9:
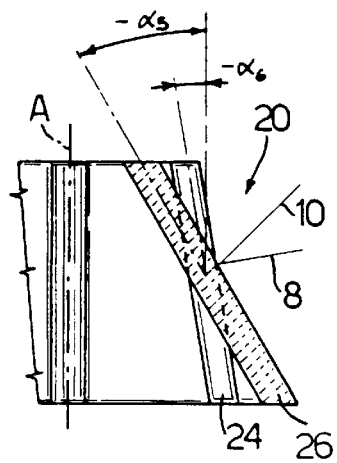
Figure 10:
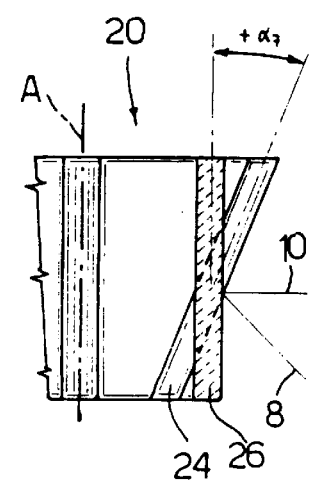

More specifically, and as shown in detail in FIG. 6, adjacent reflecting faces 24, 26 are inclined at respective angles $+\alpha_0$, $-\alpha_0$ of equal absolute value and of opposite sign.

As rotor 20 rotates, adjacent reflecting faces 24, 26 therefore generate diverging reflected rays when struck by an incident laser light ray generated by a laser light source 28 and indicated 22 in FIG. 5. More specifically, when laser light ray 22 impinges on one of first reflecting faces 24, first laser light ray 8 is generated and scans bar code 2 along first scanning line 16 as shown by the dash line in FIG. 5; and when laser light ray 22 impinges on the reflecting face 26 angularly contiguous to the previously struck reflecting face 24, second laser light ray 10 is generated and scans bar code 2 along second scanning line 18 parallel to first scanning line 16, as shown by the continuous line in FIG. 5.

FIGS. 7 to 10 show variations of rotor 20, in which faces 24, 26 are inclined at different angles from those described above, but nevertheless such as to achieve the same technical effect. More specifically, in FIG. 7, adjacent reflecting faces 24, 26 of rotor 20 are inclined at respective angles ($-\alpha_1$ and $+\alpha_2$) of different absolute value and sign; in FIGS. 8 and 9, adjacent reflecting faces 24, 26 of rotor 20 are inclined at respective angles ($+\alpha_3$, $+\alpha_4$ in FIG. 8 and $-\alpha_5$, $-\alpha_6$ in FIG. 9) of different absolute value and the same sign; and, in FIG. 10, one of the two reflecting faces, e.g. reflecting face 26, is parallel to axis of rotation A of rotor 20, while the other reflecting face, face 24 in the example shown, is inclined at a given angle (indicated $+\alpha_7$ in FIG. 10).

It should be pointed out that reading bar codes using the reading method according to the present invention in conjunction with the partial scanning technique involves certain specific provisions.

That is, as each partial scan of bar code 2 therefore comprises successive first and second scans along respective first and second scanning lines 16, 18, reliable decoding requires that the pattern matching algorithm be operated solely on scans performed along corresponding scanning lines, i.e. either along scanning lines 16 or scanning lines 18 only.

This limitation is due to the fact that two successive scans along different scanning lines may, by covering nonsuperimposed portions of the bar code, be unrelated in terms of content, thus resulting in erroneous decoding of the bar code.

When using the present method in conjunction with the partial scanning technique, therefore, each partial scan must be assigned information indicating which of the first and second component scans has provided for decoding the respective optical code portion (i.e. information indicating the reflecting face or the mirror position permitting decoding of the respective bar code portion).

This therefore provides for dividing the partial scans into two "classes", one for each reflecting face or mirror position permitting decoding of the respective bar code portion, and the pattern matching algorithm is operated solely on information from partial scans belonging to the same class.

Number 30 in FIG. 11 indicates a reading device according to a second embodiment of the present invention.

The second embodiment differs from the first described above by only scanning bar code 2 along second scanning line 18 in the event the first scan along first scanning line 16 fails to decode bar code 2, i.e. in the event first laser light ray 8 impinges on bar code 2 at an angle of 90°, thus blinding reading device 1.

More specifically, the second embodiment provides for detecting the intensity of the laser light ray reflected by bar code 2 during the first scan, and for performing the second scan in the event the intensity of the reflected laser light ray is above a predetermined threshold value.

To do this, reading device 30, as shown in FIG. 11, comprises a laser light source 32 for emitting a laser light ray 34 (shown by the dash line); a control unit 36 for controlling laser light source 32; optical focusing elements 38 located along the path of laser light ray 34; a prismatic rotor 40 located along the path of laser light ray 34, and having a polygonal base (hexagonal in FIG. 11), and a lateral surface defining a number of flat rectangular reflecting faces 41 parallel to the axis of rotation B of the rotor; and a pierced mirror 42 located along the path of laser light ray 34, upstream from rotor 40, and for letting through laser light ray 34 and deflecting the fraction of the laser light diffused by bar code 2 on to an optical focusing element 50 described later on.

Reading device 30 also comprises a flat mirror 44 located downstream from rotor 40 along the path of the laser light ray deflected by rotor 40, and movable, as described in detail later on, between a first and at least a second operating position to perform the first and second scan of bar code 2; and an actuating device 46 cooperating with and for moving mirror 44 between said first and second operating positions. If necessary, further known deflecting devices (shown schematically by a mirror 48) may be provided downstream from mirror 44 to direct on to bar code 2 the rays deflected by mirror 44.

As shown in more detail in FIG. 12, mirror 44 is so positioned with respect to rotor 40 as to have a first axis H1 inclined at a predetermined angle with respect to the axis of rotation B of rotor 40, and a second axis H2 perpendicular to first axis H1.

According to the present invention, actuating device 46 rotates mirror 44 about second axis H2 between said first and second operating positions (shown respectively by the continuous and dash lines) in which first axis H1 is inclined with respect to the axis of rotation B of rotor 40 at respective angles ($+\alpha_0$, $-\alpha_0$ in FIG. 12) of equal absolute value and of opposite sign.

Rotation about second axis H2 therefore generates first and second laser light rays 8, 10 (FIGS. 3 and 4) for scanning bar code 2 along first and second scanning lines 16, 18, while continuous rotation of rotor 40 moves laser light rays 8, 10 in scanning planes 12, 14.

Like reflecting faces 24, 26, mirror 44 may also be inclined at different angles from those described above with respect to the axis of rotation B of rotor 40, and in particular may be inclined at angles differing in absolute value and of opposite sign, differing in absolute value and of the same sign, and one of the angles may be zero.

Reading device 30 also comprises an optical focusing element 50 downstream from pierced mirror 42; a photodetecting and preamplifying device 52 located downstream from optical focusing element 50 and generating an electric signal correlated to the intensity of the laser light ray impinging on it; an amplifying device 54 connected at the input to the output of photodetecting and preamplifying device 52 to further amplify the electric signal at the output of photodetecting and preamplifying device 52; a digitizing device 56 connected at the input to the output of amplifying device 54 to digitize the electric signal supplied by amplifying device 54 and generate a sequence of binary data; and a microprocessor decoding unit 58 connected at the input to the output of digitizing device 56 to decode bar code 2 according to the sequence of binary data supplied by digitizing device 56.

Reading device 30 also comprises a peak detecting device 60 connected at the input to the output of photodetecting and preamplifying device 52, and generating an electric signal correlated to the amplitude of the highest peak of the electric signal generated by photodetecting and preamplifying device 52; a comparing device 62 connected at the input to the output of peak detecting device 60, and which provides for comparing the electric signal generated by peak detecting device 60 with a predetermined threshold value to determine a possible read blind condition, and for generating an information signal indicating the presence or absence of such a condition; and a control device 64 connected at the input to the output of comparing device 62, and generating a control signal for actuating device 46 to move mirror 44 between said first and second operating positions as a function of the information signal generated by comparing device 62.

Operation of reading device 30 will now be described with reference to an initial configuration in which mirror 44 is set to the first operating position.

Laser light source 32 emits a first laser light ray 34, which, focused by optical focusing elements 38, travels through pierced mirror 42, and is deflected by prismatic rotor 40 and mirror 44 (and any further deflecting devices) to scan bar code 2 along a first scanning line.

The fraction of the laser light ray diffused by bar code 2 is deflected by pierced mirror 42 through optical focusing device 50 to photodetecting and preamplifying device 52.

Photodetecting and preamplifying device 52 generates an electric signal correlated to the instantaneous intensity of the incident light ray, and which is supplied both to peak detecting device 60 and, after being further amplified and digitized, to decoding unit 54, which provides for decoding bar code 2.

Peak detecting device 60 generates an electric signal correlated to the highest peak value of the signal generated by photodetecting and preamplifying device 52, and which is compared by comparing device 62 with a predetermined threshold value to determine whether the electric signal even only temporarily exceeds the threshold value, thus indicating reflection on bar code 2 possibly resulting in a read blind condition.

If the electric signal generated by photodetecting and preamplifying device 52 fails to exceed the predetermined threshold value, comparing device 62 accordingly generates and supplies a corresponding information signal to control device 64. For example, if a binary (ON/OFF) information signal is used, comparing device 62 generates an information signal having a first predetermined level (e.g. 0).

Consequently, no signal for controlling actuating device 46 is generated by control device 64, so that mirror 44 remains stationary, ready to scan the next bar code 2.

Conversely, in the event the electric signal generated by photodetecting and preamplifying device 52 exceeds the predetermined threshold value, comparing device 62 accordingly generates and supplies a corresponding information signal to control device 64 in the example described, an information signal having a second predetermined level (e.g. 1).

The change in the logic level of the information signal defines an enabling signal for enabling control device 64, which accordingly generates a control signal for controlling actuating device 46, which in turn rotates mirror 44 about second axis H2 from the first to the second operating position.

When struck, in the second operating position, by laser light ray 34 generated by laser light source 32 and deflected by rotor 40, mirror 44 generates a laser light ray inclined differently from the ray generated in the first operating position, so as to perform a second scan of bar code 2 along a second scanning line parallel to the first.

At the end of the second scan, control device 64 may control actuating device 46 to either restore mirror 44 to the first operating position or leave it in the second operating position.

Figure 13:
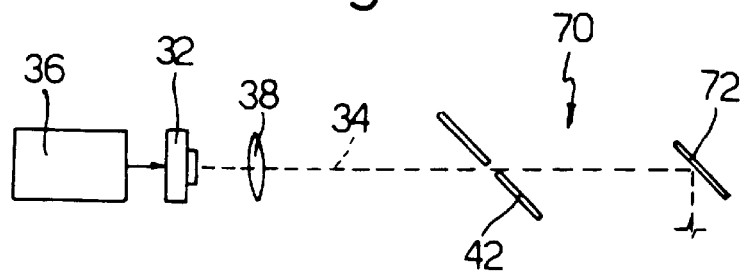
FIG. 13 shows a schematic partial view of a third embodiment of the reading device according to the present invention.

Number 70 in FIG. 13 indicates a reading device according to a third embodiment of the present invention, and which, comprising numerous parts similar to reading device 30, is only shown partially and only described insofar as it differs from device 30, using the same numbering system for any parts similar to those already described.

More specifically, and as shown in FIG. 13, reading device 70 differs from device 30 by rotor 40 and mirror 44 being replaced by a single mirror 72 having a combined movement as described below with reference to FIG. 14.

Figure 14:
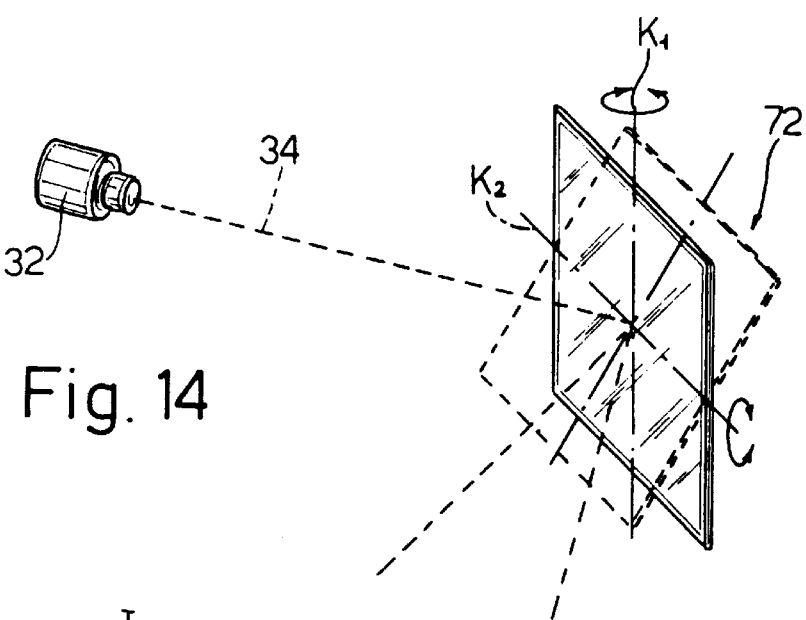
FIG. 14 shows a more detailed view of part of the FIG. 13 device.

More specifically, and as shown in FIG. 14, mirror 72 comprises a first and second axis of rotation K1, K2 crosswise to each other and to the propagation direction of incident laser light ray 34 generated by laser light source 32, and may be rotated by actuating device 46 continuously and in opposite directions about first axis of rotation K1 and discretely about second axis of rotation K2 between a first and at least a second operating position.

Discrete rotation about second axis of rotation K2 between a first and at least a second operating position therefore generates first and second laser light rays 8, 10 (FIGS. 3 and 4) for scanning bar code 2 along first and second scanning lines 16, 18, while continuous rotation in opposite directions about first axis of rotation K1 moves laser light rays 8, 10 in scanning planes 12, 14.

Like mirror 44, rotation of mirror 72 about second axis of rotation K2 from the first to the second operating position is controlled by device 64 as a function of the information signal generated by comparing device 62.

Figure 15:
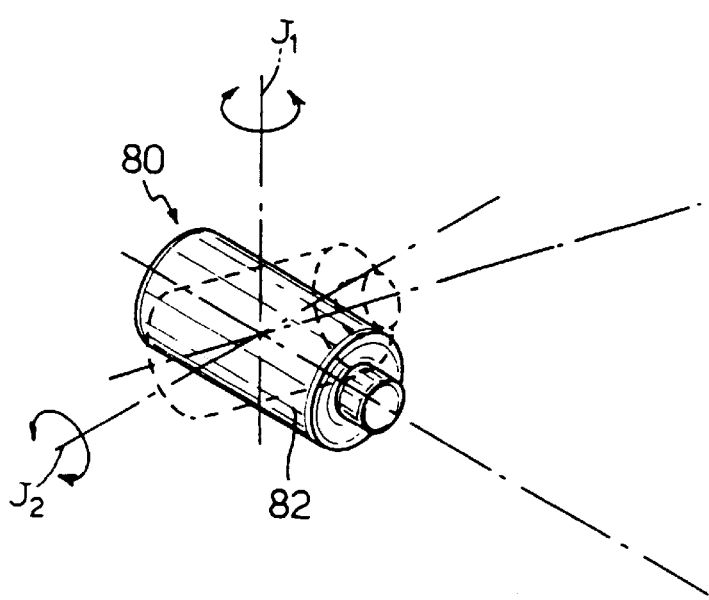
FIG. 15 shows a fourth embodiment of the reading device according to the present invention.

Number 80 in FIG. 15 indicates a reading device according to a fourth embodiment of the present invention, and which, comprising numerous parts similar to reading device 30, is only shown partially and only described insofar as it differs from device 30, using the same numbering system for any parts similar to those already described.

More specifically, and as shown in FIG. 15, reading device 80 differs from device 30 by rotor 40 and mirror 44 being eliminated, and by first and second laser light rays 8, 10 for scanning bar code 2 along first and second scanning lines 16, 18 being generated by a laser light source 82 rotated by actuating device 46 about a first and second axis J1, J2 perpendicular to each other (and possibly also using further deflecting devices for directing the rays on to bar code 2).

More specifically, laser light source 82 rotates continuously and in opposite directions about first axis of rotation J1 to move laser light rays 8, 10 in scanning planes 12, 14 (FIGS. 3 and 4), and discretely about second axis of rotation J2 between a first and at least a second operating position to generate first and second laser light rays 8, 10 for scanning bar code 2 along first and second scanning lines 16, 18 parallel to each other.

Like mirror 44, rotation of laser light source 82 about second axis of rotation J2 from the first to the second operating position is controlled by device 64 as a function of the information signal generated by comparing device 62.

The advantages of the method according to the present invention will be clear from the foregoing description.

In particular, the method according to the present invention provides for greatly reducing the negative effects of rays reflected by, say, plastic reflecting surfaces, so that blinding of the reading devices is completely eliminated, the bar code may be read even in the presence of reflected rays, and the reliability of the readers according to the present invention is improved.

Clearly, changes may be made to the reading method and device as described and illustrated herein without, however, departing from the scope of the present invention.

For example, as opposed to being perfectly parallel, first and second scanning lines 16, 18 may diverge or converge slightly in the scanning direction.

Moreover, rotor 40 and mirror 44, as well as mirror 72 and laser light source 82, may be substituted for rotor 20 to generate laser light rays 8, 10 continuously, and not only, as described above, to scan bar code 2 along second scanning line 18 in the event bar code 2 fails to be decoded by the first scan along first scanning line 16.

What is claimed is:

1. A method of reading an optical code with a device capable of generating light rays for scanning said optical code; said device further being capable of detecting diffusion of said light rays thereby to read said optical code, the method comprising the steps of:

a) generating at least a first light ray, along a first scanning plane, for performing at least a first scan of said optical code, b) determining whether said first scan of said optical code is successful, and if said first scan of said optical code is unsuccessful, generating at least a second light ray, along a second scanning plane distinct from said first scanning plane, for performing a second scan of said optical code.

2. A method of reading an optical code with a device capable of generating light rays for scanning said optical code; said device further being capable of detecting diffusion of said light rays thereby to read said optical code, the method comprising the steps of:

a) generating at least a first light ray, along a first scanning plane, for performing at least a first scan of said optical code;

b) detecting the intensity of light reflected by said optical code during said first scan and comparing said detected intensity of light with a predetermined threshold value, c) wherein, if said detected intensity of light exceeds said threshold value, a signal is generated for actuating said device to generate at least a second light ray, along a second scanning plane distinct from said first scanning plane, for performing a second scan of said optical code.

3. A method of reading an optical code with a device capable of generating light rays for scanning said optical code; said device further being capable of detecting diffusion of said of light rays thereby to read said optical code, the method comprising the steps of:

a) generating a plurality of light rays along a plurality of scanning planes, each said scanning plane corresponding to an angle relative to the plane of said optical code, thereby to form a plurality of parallel scanning lines for scanning said optical code; said scanning lines being inclined with respect to said optical code, wherein, being so inclined, each said scanning line is capable of achieving a partial scan of said optical code, whereby each said partial scan generates a partial reading of said optical code;

b) assigning each said partial reading of said optical code to a respective class according to the respective angle of said light ray generating said partial reading;

c) thereafter combining said partial readings of said optical code corresponding to common respective assigned classes, thereby to achieve a complete reading of said optical code.

4. The method of claim 3 wherein each scan of said optical code includes generating at least a first and second scan line and whereby said step of assigning said partial readings to respective classes further includes the step of assigning to said partial readings information indicating which of said first and said second scanning lines has permitted reading of the respective optical code portion.

5. A method of reading an optical code with a device capable of generating light rays for scanning said optical code; said device further being capable of detecting diffusion of said of light rays thereby to read said optical code, the method comprising the steps of:

a) generating at least a first light ray along a first scanning plane thereby to form a first scanning line for performing at least a first scan of said optical code;

b) performing a test on the results of said first scan;

thereafter analyzing the results of said test performed on said first scan; and, depending on said results of said test, generating at least a second light ray, along a second scanning plane thereby to form a second scanning line for performing a second scan of said optical code.

6. The method of claim 5 wherein said first and said second scanning lines are formed parallel to each other.

7. The method of claim 5 wherein said first and said second scanning planes are distinct from and intersect each other.

8. A method of reading an optical code with a device capable of generating at least a first and second light ray, said first and second light rays being emitted from said device respectively along first and second scanning planes at angles $\alpha_1$ and $\alpha_2$ with respect to the plane of said optical code, said first and second light rays being capable of forming first and second scan lines, said device further including a sensing device capable of sensing light, the method comprising the steps of:

a) performing, along a first scan line at a first angle $\alpha_1$, a first scan of said optical code;

b) performing, along a second scan line at a second angle $\alpha_2$, a second scan of said optical code;

whereby said angles $\alpha_1$ and $\alpha_2$ diverge with respect to each other such that said sensing device senses, from at least one of said scans, diffused light and not reflected light.

9. An optical code reading device comprising:

a generating means capable of generating at least a first and second light ray; thereby to form first and second scan lines for performing first and second scans of an optical code, said device further including a sensing device capable of sensing light;

wherein said device is capable of emitting said first and second light rays respectively along first and second scanning planes at angles $\alpha_1$ and $\alpha_2$ with respect to the plane of said optical code, said angles $\alpha_1$ and $\alpha_2$ diverging with respect to each other such that said sensing device senses, from at least one of said scans, diffused light and not reflected light.

10. An optical code reading device comprising:

a generating means capable of generating at least a first and second laser light ray along a first and second distinct scanning plane, respectively, for successively performing at least a first and second scan of an optical code along first and second scanning lines respectively;

an evaluating means capable of determining whether said first scan of said optical code is successful, said evaluating means generating an enabling signal if said first scan is unsuccessful;

an activating means capable of receiving said enabling signal, and capable of activating said generating means to generate a second laser light ray for performing a second scan of said optical code along a second scanning line, in response to said enabling signal;

wherein said generating means comprises a laser light source capable of generating a source laser light ray having a predetermined propagation direction; and an orientable deflecting means located proximal the propagation path of said source laser light ray, and wherein said orientable deflecting means comprises a polygonal-based, substantially prismatic rotor, capable of rotating about a respective axis of rotation, which includes a lateral surface defining a plurality of reflecting faces substantially parallel to said axis of rotation; and an orientable mirror located proximal the propagation path of rays deflected by said rotor which is moveable between at least a first and a second operating position, wherein said first and second operating positions correspond to a first and a second angle with respect to said axis of rotation.

11. The optical code reading device according to claim 10 wherein said orientable mirror and said laser light source are capable of being moved between respective first and second operating positions in response to an activating signal generated by said activating means.

12. An optical code reading device comprising:

a generating means capable of generating at least a first and second laser light ray along a first and second distinct scanning plane, respectively, for successively performing at least a first and second scan of an optical code along first and second scanning lines respectively;

an evaluating means capable of determining whether said first scan of said optical code is successful, said evaluating means generating an enabling signal if said first scan is unsuccessful;

an activating means capable of receiving said enabling signal, and capable of activating said generating means to generate a second laser light ray for performing a second scan of said optical code along a second scanning line, in response to said enabling signal;

wherein said generating means comprises a laser light source capable of generating a source laser light ray having a predetermined propagation direction; and an orientable deflecting means located proximal the propagation path of said source laser light ray;

wherein said orientable deflecting means comprises a polygonal-based, substantially prismatic rotor, capable of rotating about a respective axis of rotation, which includes a lateral surface defining a plurality of reflecting faces substantially parallel to said axis of rotation, and an orientable mirror located proximal the propagation path of rays deflected by said rotor which is moveable between at least a first and a second operating position, wherein said first and second operating positions correspond to a first and a second angle with respect to said axis of rotation; and wherein said evaluating means comprises: a photodetecting means capable of generating a first electric signal corresponding to the intensity of the laser light ray diffused by said optical code; a peak detecting means including a peak detecting means input for communicating with an output of said photodetecting means and capable of generating a second electric signal corresponding to the amplitude of the highest peak of said first electric signal; and a comparing means including a comparing means input for communicating with an output of said peak detecting means which is capable of comparing said second electric signal to a predetermined threshold value and thereafter generating said enabling signal if said second electric signal exceeds said predetermined threshold value.

13. An optical code reading device comprising:

a generating means capable of generating at least a first and second laser light ray along a first and second distinct scanning plane, respectively, for successively performing at least a first and second scan of an optical code along first and second scanning lines respectively;

an evaluating means capable of determining whether said first scan of said optical code is successful, said evaluating means generating an enabling signal if said first scan is unsuccessful;

an activating means capable of receiving said enabling signal, and capable of activating said generating means to generate a second laser light ray for performing a second scan of said optical code along a second scanning line, in response to said enabling signal.

14. The optical code reading device according to claim 13 wherein said first and second scanning lines are parallel.

15. The optical code reading device according to claim 13 wherein said generating means comprises a laser light source capable of generating a source laser light ray having a predetermined propagation direction; and an orientable deflecting means located proximal the propagation path of said source laser light ray, said laser light source and said orientable deflecting means being provided for generating said first and said second laser light ray.

16. The optical code reading device according to claim 15 wherein said orientable deflecting means comprises a rotor capable of rotating about a respective axis of rotation which includes a lateral surface defining a plurality of reflecting faces wherein adjacent reflecting faces of said rotor are inclined at different angles with respect to said axis of rotation.

17. The optical code reading device according to claim 16 wherein said adjacent reflecting faces are inclined at respective angles of equal absolute value and of opposite sign.

18. The optical code reading device according to claim 16 wherein said adjacent reflecting faces are inclined at respective angles of opposite sign and differing in absolute value.

19. The optical code reading device according to claim 16 wherein said adjacent reflecting faces are inclined at respective angles of same sign but differing in absolute value.

20. The optical code reading device according to claim 15 wherein said orientable deflecting means comprises a polygonal-based, substantially prismatic rotor, capable of rotating about a respective axis of rotation, which includes a lateral surface defining a plurality of reflecting faces substantially parallel to said axis of rotation, and an orientable mirror located proximal the propagation path of rays deflected by said rotor which is moveable between at least a first and a second operating position, wherein said first and second operating positions correspond to a first and a second angle with respect to said axis of rotation.

21. The optical code reading device according to claim 15 wherein said orientable deflecting means comprises an orientable mirror located proximal the propagation path of said source laser light ray generated by said laser light source which includes a first and second axis of rotation, each said axis of rotation being perpendicular to the other; wherein during operation, said orientable mirror is rotated continuously about said first axis of rotation to a first and at least a second operating position and is rotated discretely about said second axis of rotation between a third and at least a fourth operating position.

22. The optical code reading device according to claim 13 wherein said generating means comprises a laser light source rotatable about a first and second axis of rotation, each said axis of rotation being perpendicular to the other; wherein during operation, said laser light source rotates continuously about said first axis of rotation between a first and at least a second operating position and rotates discretely about said second axis of rotation between a third and at least a fourth operating position.

23. An optical code reading device comprising:

a generating means capable of generating at least a first and second laser light ray along a first and second distinct scanning plane, respectively, for successively performing at least a first and second scan of an optical code along first and second scanning lines respectively;

wherein said optical code reading device is capable of performing a test on the results of said first scan; and thereafter analyzing the results of said test performed on the first scan; and, depending on said results of said test, generating at least a second light ray, along a second scanning plane thereby forming a second scanning line for performing a second scan of said optical code.

24. An optical code reading device comprising:

a generating means capable of generating at least a first and second laser light ray along a first and second distinct scanning plane, respectively, for successively performing at least a first and second scan of an optical code along first and second scanning lines respectively;

an evaluating means capable of comparing the intensity of light reflected by said optical code, during said first scan, with a predetermined threshold value;

whereby, if said detected intensity of light exceeds said threshold value, an enabling signal is generated for actuating said device to generate at least a second light ray, along a second scanning plane distinct from said first scanning plane, for performing a second scan of said optical code;

wherein said evaluating means comprises a photodetecting means capable of generating a first electric signal corresponding to the intensity of the laser light ray diffused or reflected by said optical code; a peak detecting means including a peak detecting means input for communicating with an output of said photodetecting means and capable of generating a second electric signal corresponding to the amplitude of the highest peak of said first electric signal; and a comparing means including a comparing means input for communicating with an output of said peak detecting means which is capable of comparing said second electric signal to a predetermined threshold value and thereafter generating said enabling signal if said second electric signal exceeds said predetermined threshold value.

* * * * *